United States Patent Office 3,370,522
Patented Feb. 27, 1968

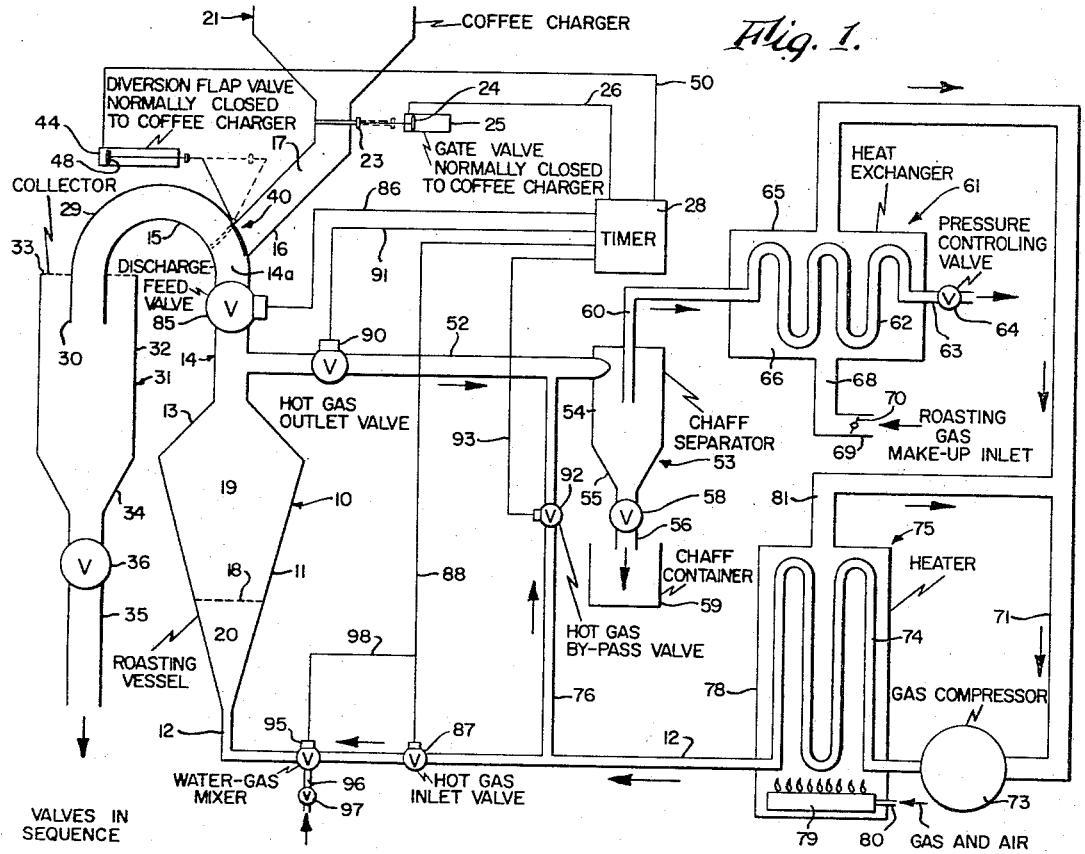

3,370,522
METHOD AND APPARATUS FOR HEAT TREATING, PRESSURIZING AND DISCHARGING MATERIALS
James P. Anderson, West Seneca, and Maurice W. Vincent, Clarence, N.Y., assignors to Blaw-Knox Company, Pittsburgh, Pa., a corporation of Delaware
Filed May 19, 1966, Ser. No. 551,296
7 Claims. (Cl. 99—236)

This invention relates to heat treating, pressurizing and discharging materials, with or without a mass transfer, such as removal of moisture from the materials, and other treatment, such as puffing the materials.

The invention will be more specifically described in conjunction with the pressure roasting of coffee in which the beans or particles are rapidly pressure roasted in small batches as beds fluidized by a stream of hot and pressurized, and preferably humidified gas, controlled as to temperature and pressure, and also preferably humidity, and thereafter rapidly transferred to a cooler, to produce roasted coffee having qualities not obtainable with conventional processes.

However, the invention is also applicable to roasting nuts and other seeds, such as wheat seeds and cocoa beans, as well as to give a controlled degree of heat treatment of organic plastic polymers, such as polyvinyl chloride, polyvinyl pyrrolidone, polypropylene, polyethylene, acrylonitrile and polybutadiene. These polymers are often produced in suspension by the action of heat and catalysts. Their monomers and the product of the reaction is a suspension of beads or bead-like polymers. The present process and apparatus can be used for further polymerization or heat treatment of these beads by heat and pressure, for example to increase molecular weight.

Adverting to coffee roasting, conventional coffee roasting methods involving high temperature treatment for a considerable length of time can result in degradation of substances within the bean with resulting off-flavors and also, due to the thickness of the bean, the roasting effect, as well as the cooling effect, on the bean will vary with the size of the bean.

It is an object of the invention to provide a roasting method and apparatus providing improved flavor and qualities in the product thereby, in coffee roasting, to upgrade the beverage obtained from poorer grades of coffee beans. This is achieved by roasting the coffee or other seeds or nuts in small batches in a fluidized bed under high pressure and temperature for short periods of time, and suddenly releasing the pressure and effecting rapid transfer of the coffee to a collector which is preferably in the form of a cooler. This sudden reduction in pressure also preferably has a slight puffing effect on the coffee.

Another object is to provide roasted coffee which will produce a brew having increased coffee flavor and coffee strength as compared with conventional roasting, and which will provide more water extractable solids than with other roasting methods. This is achieved not only by the aforementioned short period high pressure and temperature small batch roasting with subsequent reduction in pressure to mildly puff the coffee and effect rapid transfer to a collector or cooler, but also by the controlled addition of water to the hot roasting gas, it having been found that such humidification greatly increased the water extractable solids in the roasted product.

Another object is to provide for rapid transfer of the successively treated batches from the heating and pressurizing vessel to a collector or cooler, this being achieved by using the sudden drop in pressure to drive the roasted coffee or other product out of the heating and pressurizing vessel into the collector or cooler.

Another object is to provide such apparatus which is fully automatic, operating rapidly to pressurize, heat and fluidize each small batch of coffee or other material; to add water to the hot pressurized gas; to effect rapid pressure reduction to drive the product rapidly from the heating and pressurizing vessel to the collector or cooler; and to recharge the vessel with a succeeding batch for a rapid repetition of the cycle.

Another object of the invention is to provide such apparatus which can be adjusted to the particular type, condition and grade of the unroasted coffee or other material being processed.

Another object is, however, to provide such apparatus which does not require highly critical adjustment to provide improved flavor, strength and qualities, such as controlled polymerization, of the product.

Another object is to provide such apparatus which can be adjusted so that the treating and pressurizing of the successive batches is uniform in all respects and there is no danger of overtreatment at one period and undertreatment at another period.

Another object is to provide such apparatus which does not require close supervision to obtain the advantageous results.

Another aim is to provide such apparatus which is simple and inexpensive in construction and is readily kept in a clean and sanitary condition.

Another object is to provide a process and apparatus which has the above advantages in the polymerization of organic plastics as previously set forth.

In the accompanying drawings, FIG. 1 is a simplified diagrammatic representation of coffee roasting apparatus embodying the present invention. FIG. 2 is a bar graph showing a full sequence of the operation of the various valves and diverter flap plotted against time in seconds. FIG. 3 is an enlarged fragmentary vertical section of the diverter flap and its operating shaft and lever and illustrating the manner in which it can be swung to a dotted line position to admit a charge of an unroasted batch of coffee into the roasting vessel into a full line position deflecting the puffed coffee impelled out of the roasting vessel into a gooseneck duct leading to a cooler.

The numeral 10 diagrammatically represents in simplified form a heating and pressurizing roasting vessel which in use would be provided with a thermal insulation jacket (not shown) and is in the form of an upright tubular shell open at its top and bottom and preferably having an upwardly diverging conical bottom portion 11 with its small open bottom end connecting with and merging into a hot gas inlet duct 12 for the heated, pressurized, and preferably humidified gas used for roasting, and with its large upper end connected with and merging into the bottom of an upwardly converging conical top portion 13 the upper end of which connects with and merges into an upright top duct 14. The lower part of this duct is cylindrical, but its extreme upper end 14a, together with its upstanding Y-branches 15 and 16, are preferably square in cross section. The interior of the Y-branch 16 forms a measuring chamber 17 for each batch of coffee to be roasted, as hereinafter described. A horizontal foraminous or perforated shelf or plate 18 extends across the bottom section 11 of the roasting vessel and divides it into a top roasting chamber 19 and a bottom gas inlet chamber 20.

The unroasted coffee is contained in a coffee charger or hopper 21 from which the unroasted coffee moves by gravity down into the measuring chamber 17 in upstanding Y-branch 16 of the top duct 14, 14a, this coffee being supplied in small batches, measured by the size of the measuring chamber 17 as hereinafter described, by a normally closed gate valve 23 actuated by a piston 24 in a cylinder 25. Compressed air for opening this normally closed gate valve can be supplied to the cylinder 25 via a control line 26 from a timer 28. The control circuit is illustrated in simplified form and the timer 28 controls the sequence of pressurizing the various control lines to control the valves and diversion flap in the sequence illustrated by the bar graph, FIG. 2.

The upstanding Y-branch 15 is continued in the form of a gooseneck curve 29 having a downwardly directed open end 30 which discharges into a roasted coffee cooler and collector 31. This collector cooler can be of any suitable form having a vertical cylindrical body 32 with a screened open top 33 and conical bottom 34 leading to a vertical discharge pipe 35. It can be cooled by any suitable means (not shown). After the desired quantity of roasted coffee collects in the cooler 31, it can be withdrawn by opening a discharge valve 36. This valve could, of course, be actuated by the timer 28 but as it forms no part of the present invention it is not so illustrated.

The top duct 14, 14a and its upstanding Y-branches 15 and 16 serve both to charge the batches of unroasted coffee and to discharge the batches of roasted coffee and, to effect such alternate functioning, and also to determine the size of the batches, a diverter flap valve, indicated generally at 40, is provided to render one or the other of these Y-branches operative, and to determine the size of the measuring chamber 17. This diverter flap valve 41 is shown enlarged in FIG. 3 as comprising a rectangular sheet metal plate or flap 41 (the upper extremity 14a of the top duct 14 and its Y-branches 15, 16 being rectangular in cross section for this purpose) fixed at its upper edge to a horizontal rock shaft 42 suitably journaled in the crotch of the Y-branches 15, 16 so that it can be swung from the full line position closing off the Y-branch 16, in which it forms the bottom of the measuring chamber 17, to the dotted line position closing off the Y-branch 15. Preferably this flap is curved to conform to the curvature and form a curved continuation of the top wall of the Y-branch 15 when in its full line position so as to provide a curved deflector leading the roasted coffee into the gooseneck 29.

The diverter flap valve 40 is actuated by an arm 45 attached to one end of the rock shaft 42 exteriorly of the upstanding Y-branches 15, 16 and connected with the rod 46 of a piston 48 in a cylinder 44, this piston rod being normally biased by means (not shown) to hold the flap or metal sheet 41 in the full line position illustrated in which it closes off the upstanding Y-branch 16 to form the batch measuring chamber 17. Compressed air for moving this diverter flap valve to its dotted line position is shown as supplied to the cylinder 44 via a control line 50 from the timer 28.

The top duct 14 of the roasting vessel 10 is provided with a hot gas outlet duct 52 leading to a chaff separator 53. This chaff separator can be of any conventional form, being shown as a closed upright cylindrical body 54 having the duct 52 arranged to discharge tangentially into its top and a conical bottom 55 having a discharge spout 56 rendered operative by a valve 58 to discharge the chaff into a removable container 59.

The outlet duct 60 from the chaff separator 53 includes a vertical part projecting axially down into the body or shell 54 and a horizontal part leading to the inlet of a heat exchanger 61 where it connects with a coil 62 leading to a discharge outlet 63 having a valve 64 for controlling pressure. This pressure controlling valve serves to maintain a constant back pressure in the heat exchanger coil 62 and hence in the entire system except for the upstanding Y-branches 15, 16, as hereinafter described.

The shell 65 of the heat exchager 61 forms a chamber 66 surrounding the coil 62 and having an inlet duct 68 which, under control of a damper 70, admits outside make-up air to the system to provide the roasting gas. The heat exchanger chamber 66 has an outlet duct 71 leading to the inlet of a gas compressor 73. The compressed roasting gas from the compressor 73 passes through the coil 74 of a heater 75 and thence into the hot gas inlet duct 12 alternately to the heating and pressurizing roasting vessel 10 or to a bypass duct 76 connecting this hot gas inlet duct 12 to the hot gas outlet duct 52 leading into the chaff separator 53.

The enclosed shell 78 of the heater 75 has a gas burner 79 below the coil 74 and supplied with a proper mixture of gas and air from a line 80. Its stack 81 connects directly with the outlet duct 71 of the heat exchanger 61.

In addition to the feed hopper gate valve 23 and diverter flap valve 40, the operation of the apparatus is automatically controlled by the following apparatus:

The numeral 85 represents a pressure retaining, discharge and feed valve in the cylindrical part of the top duct 14 between the chaff discharge branch 52 and the square base 14a of the upstanding Y-branches 15, 16. It is opened and closed by the timer 28 via a line 86. The numeral 87 represents a hot gas inlet valve in the line 12 between the roasting vessel 10 and bypass duct 76. It is opened and closed by the timer 28 via a line 88. The numeral 90 represents a hot gas outlet valve in the hot gas outlet line 52 between the roasting vessel 10 and the bypass duct 76. It is opened and closed by the timer 28 via a line 91. The numeral 92 represents a hot gas bypass valve in the bypass duct 76. It is opened and closed by the timer 28 via a line 93.

The numeral 95 represents a mixing valve arranged in the hot gas inlet duct 12 between the roasting vessel 10 and hot gas inlet valve and connected to a water supply pipe 96 so as to supply water to the hot gas flowing through this duct 12. This mixing valve is opened and closed by the timer 28 via a branch line 98 from the control line 88 to the hot gas inlet valve 87. The ratio of water from the pipe 96 to air flowing through the conduit 12 is controlled by a valve 97 which can be a hand set valve.

OPERATION

Hot gas, derived from the products of combustion from the stack 81 of the gas burner 79 and make-up atmospheric air from the dampered inlet 68 to the heat exchanger 61, is supplied via duct 71 under pressure by the gas compressor 73 through the coil 74 of the heater 75 to the hot gas supply duct 12 at a temperature between about 350° to about 1,000° F., and preferably between about 450° to about 600° F. and at a pressure in the order of from not less than about 60 p.s.i.g. or higher and preferably in excess of 80 p.s.i.g., such pressure having been found necessary to discharge the coffee or other product from the heating and pressurizing vessel 10 using the air supply pressure for this purpose.

At the start of the sequence illustrated in the bar graph, FIG. 2, the hot gas inlet valve 87 is closed at this time while the hot gas bypass valve 92 has been open for 7 seconds. Accordingly this hot pressurized gas from the hot gas supply duct 12 is bypassed through bypass duct 76, open bypass valve 92, hot gas outlet duct 52, chaff separator 53, duct 60 and heat exchanger 61 past constant back pressure control valve 64 and outlet duct 63 to the atmosphere.

The gate valve 23 at this assumed start of sequence is then opened by the timer 28 for two seconds, this time being sufficient to fill the measuring chamber 17. An amount of unroasted coffee therefore flows from the hopper or charger 21 into the upstanding Y-branch 16, and since the diversion flap valve 40 is at this time in its full line position, the bottom of the upstanding Y-branch 16 is blocked to form the measuring chamber 17 and a full charge of unroasted coffee is therefore trapped in this Y-branch 16. At the end of 2 seconds the gate valve 23 closes so as to isolate the measured charge of unroasted coffee in the measuring chamber 17.

At this assumed start of sequence, the discharge feed valve 85 is open and remains open so that upon moving the diversion flap valve 40 to the dotted line position, which is done by the timer 28 for a period of 2 seconds following an interval of 2 seconds after closing the gate valve 23, the measured small charge of unroasted coffee, determined by the size of the measuring chamber 17, flows by gravity from the upstanding Y-branch 16, past the diversion flap valve which is now open to this upstanding Y-branch, and past open discharge feed valve 85 and through the top duct 14 and top chamber 19 of the roasting vessel 10 onto its internal horizontal perforated plate 18.

At the end of 8 seconds from the assumed start of sequence, the timer 28 closes the discharge feed valve 85 and two seconds thereafter opens the hot gas inlet valve 87 so that hot pressurized gas is admitted to the bottom chamber 20 of the heating and pressurizing vessel 10.

At this same time, the timer 28 (via branch control line 98) opens the mixing valve 95 so that water is admitted to the hot gas in the duct 12 to humidify the same. The ratio of water so admitted to hot compressed air flowing through the duct 12 is determined by the setting of the valve 97. Two seconds thereafter the hot gas outlet valve 90 opens and in another two seconds the hot gas bypass valve 92 closes. Accordingly the hot pressurized gas from the hot gas supply duct 12 now flows in its entirety through the bottom chamber 20 of the roasting vessel 10 up through the perforated plate 18 into the top chamber 19 thereof. This hot gas stream has been humidified by water from the mixing valve 95. This humidified stream of hot gas converts the coffee on this screen into a fluidized bed, the beans or particles being held in suspension by the hot pressurized humidified gas moving upwardly through the screen and dancing around so as to be brought quickly up to roasting temperature. The enlarging conical form of the bottom of the roasting vessel 10 controls upward displacement of the beans of the fluidized bed since the upwardly increasing cross sectional area of the top chamber 19 acts to diminish the lifting force of the hot pressurized humidified gas emerging upwardly from the perforated plate 18. After performing the heating and roasting operation in the fluidized bed, the spent gas passes the open hot gas outlet valve 90 in the hot gas outlet line 52 into the chaff separator 53 in which the chaff released from the roasting coffee collects to be removed at intervals by means of the valve 58. The spent hot gas continues through the duct 60 and coil 62 of the heat exchanger 61 where it serves to raise the temperature of the make-up air from inlet duct 68 before being admitted to the compressor 71. The spent gas then passes out through the vent duct 63 under control of the pressure controlling valve 64 which controls the back pressure against the pressurized hot roasting gas in the roasting vessel 10.

After roasting in the fluidized bed on the perforated plate 18 is substantially completed, the timer 28 next opens the bypass valve 92, this, according to the graph, FIG. 2, being 93 seconds after the opening of the hot gas inlet valve 87. This roasting period may, however, range from 20 seconds to 180 seconds depending on the temperature and pressure and type of beans being processed. One second later the timer closes the hot gas outlet valve 90, and in another second closes the hot gas inlet valve 87 and also the water mixing valve 95. Accordingly the hot pressurized gas from the gas fired heating coil 74 and hot gas supply pipe 12 now again passes through the bypass duct 76, open bypass valve 92, hot gas outlet duct 52, chaff separator 53, duct 60, heat exchanger coil 62, pressure controlling valve 64 and vent 63 to the atmosphere.

Three seconds following the closing of the hot gas inlet valve 87 the timer opens the discharge feed valve 85. Since at this time the plate or flap 41 of the diversion flap valve 40 is in the full line position in which it closes the upstanding Y-branch 16, this opening of the discharge feed valve 85 suddenly opens the chamber 19 of the roasting vessel, containing hot pressurized gas at the roasting pressure, to atmosphere via the gooseneck 29 and collector 31. This sudden reduction in pressure not only impels the entire batch of roasted coffee on the perforated plate 18 upwardly and out through the gooseneck outlet 29 into the cooler 31, but the sudden reduction in pressure on the exterior of each roasted coffee bean or particle causes it to puff slightly by reason of the pressurized air and vapor in its cells, rupturing the cells to obtain a product having the desired improved flavor, cup strength and qualities.

It has been found that a roaster pressure of not less than 60 p.s.i.g. is necessary to assure complete discharge of the roasted beans from the chamber 19 via the gooseneck 29 into the collecting vessel 31 by means of this roasting pressure above. Of course, higher roaster pressures will also assure such complete removal in the manner described.

The following are examples of the practice of the invention in producing uniformly dark brown roasted coffee beans having improved flavor and quality:

|  | A | B | C | D | E | F |
|---|---|---|---|---|---|---|
| Time of Full Cycle, Sec | 90 | 90 | 90 | 90 | 90 | 90 |
| Air to Roaster—Start, Deg. F | 500 | 500 | 500 | 500 | 500 | 500 |
| Air to Roaster—End, Deg. F | 465 | 458 | 460 | 445 | 460 | 462 |
| Air Pressure in Roaster, p.s.i.g | 82 | 88 | 79 | 80 | 94 | 83 |
| Air Flow, c.f.m.—actual | 21.5 | 19.4 | 21.8 | 20.6 | 18.8 | 21.4 |
| H$_2$O added, lbs./pound of air |  |  |  |  |  | 0.069 |
| Density of Finished Product, lbs./cu. ft | 20.7 | 21 | 21.2 | 21.0 | 21.8 |  |
| Percent H$_2$O in Finished Product | 2.6 | 3.0 | 3.1 | 3.0 | 3.0 | 2.4 |
| Percent Water Extractable Solids in Finished Product | 37.6 | 37.4 | 37.2 | 36.0 | 37.6 | 39.6 |
| pH of Brewed coffee | 5.2 | 5.2 | 5.2 | 5.4 |  | 5.2 |

It will be seen that in roast F above, where water was added by mixing valve 95, the recovery of water extractable solids was substantially greater than in the other roasts where such humidification of the hot pressurized roasting gas was not done. However, all of the roasts produced roasted coffee having improved flavor, quality and a greater percentage of water extractable solids as compared with conventional roasting methods.

We claim:
1. Apparatus for heat and pressure treating materials of the character described, comprising a pressure and heat treating vessel, means adapted to support a batch of untreated materials in said vessel, an inlet duct connected to said vessel adapted to charge successive batches of untreated materials onto said support, an outlet duct for the treated batches connected to and leading from the upper part of said vessel above said support to a low pressure zone, said upper part of said vessel being shaped to guide each entire treated batch into said outlet duct when propelled from said support by the pressure differential between said pressure and heat treating vessel and low pressure zone, means providing a pressure seal closing both said inlet and outlet ducts following each such charging of a batch of untreated materials, means adapted to pass a stream of pressurized hot gas through said vessel in contact with each batch of untreated materials on said support, and means rendering said last means operative for a limited period of time sufficient to treat each batch of materials and thereafter opening said pressure sealing means to said outlet duct thereby to establish said pressure differential and expel each treated batch of materials from said support out through said outlet duct into said low pressure zone.

2. Apparatus as set forth in claim 1 wherein said support means is in the form of a horizontal foraminous shelf and wherein said means adapted to pass a stream of pressurized hot gas through said vessel includes an inlet pipe below said foraminous shelf and an outlet pipe above said foraminous shelf whereby said stream of pressurized hot gas fluidizes each batch of untreated materials on said foraminous shelf to be more effective in heating the same.

3. Apparatus as set forth in claim 2 wherein said upper part of said pressure roasting vessel is of upwardly diminishing generally frusto-conical form leading to said outlet duct at its upper end and the lower part of said pressure roasting vessel is of downwardly diminishing generally frusto-conical form and connected at its lower end with said inlet pipe.

4. Apparatus as set forth in claim 3 wherein said foraminous shelf is across said downwardly diminishing frusto-conical lower part of said roasting vessel.

5. Apparatus as set forth in claim 1 wherein said outlet duct is in the form of a gooseneck and said low pressure zone is in the form of an atmospheric collector at the outlet end of said gooseneck.

6. Apparatus as set forth in claim 1 wherein said inlet and outlet ducts are in the form of upstanding Y-branches of a single duct connected with the upper part of said vessel with said means providing a pressure seal being across such single duct and wherein the apparatus additionally includes a diverter flap in said single duct movable to positions across the openings of one or the other of said Y-branches and means adapted to move said diverter flap across the opening of said outlet Y-branch to charge said vessel with a batch of untreated materials and across said opening to said inlet Y-branch on such opening of said pressure sealing means to expel each treated batch of materials out through said outlet Y-branch.

7. Apparatus as set forth in claim 1 additionally including means adapted to add water to the stream of pressurized hot gas admitted to said vessel to humidify the same.

References Cited

UNITED STATES PATENTS

| 2,497,501 | 2/1950 | Himmel et al. | 99—68 |
| 2,859,116 | 11/1958 | Heimbs et al. | 99—68 |
| 3,088,825 | 5/1963 | Topalian et al. | 99—68 |
| 3,128,690 | 4/1964 | Maehl | 99—238 |
| 3,329,506 | 7/1967 | Smith | 99—68 |

FOREIGN PATENTS

| 674,935 | 7/1952 | Great Britain. |

J. M. NEARY, *Primary Examiner.*

UNITED STATES PATENT OFFICE
CERTIFICATE OF CORRECTION

Patent No. 3,370,522                      February 27, 1968

James P. Anderson et al.

It is certified that error appears in the above identified patent and that said Letters Patent are hereby corrected as shown below:

Column 6, in the table, fifth column, line 3 thereof, for "445" read -- 455 --.

Signed and sealed this 24th day of June 1969.

(SEAL)
Attest:

Edward M. Fletcher, Jr.               WILLIAM E. SCHUYLER, JR.
Attesting Officer                        Commissioner of Patents